(12) United States Patent
Balakrishnan et al.

(10) Patent No.: US 8,140,758 B2
(45) Date of Patent: Mar. 20, 2012

(54) DATA REORGANIZATION IN NON-UNIFORM CACHE ACCESS CACHES

(75) Inventors: Ganesh Balakrishnan, Apex, NC (US); Gordon B. Bell, Cary, NC (US); Anil Krishna, Cary, NC (US); Srinivasan Ramani, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/429,754

(22) Filed: Apr. 24, 2009

(65) Prior Publication Data

US 2010/0274973 A1    Oct. 28, 2010

(51) Int. Cl.
*G06F 15/163*     (2006.01)
(52) U.S. Cl. ......... 711/119; 711/118; 711/129; 711/157
(58) Field of Classification Search .......... 711/119, 711/3, 129, 157, 118
See application file for complete search history.

(56) References Cited

U.S. PATENT DOCUMENTS

| | | | |
|---|---|---|---|
| 5,594,886 A | 1/1997 | Smith et al. | |
| 6,631,445 B2 | 10/2003 | Rappoport et al. | |
| 6,662,271 B2 | 12/2003 | Smits | |
| 6,965,969 B2 * | 11/2005 | Burger et al. | 711/128 |
| 7,020,748 B2 | 3/2006 | Caprioli | |
| 7,069,390 B2 | 6/2006 | Chen et al. | |
| 7,287,122 B2 * | 10/2007 | Rajamony et al. | 711/120 |
| 2003/0005224 A1 | 1/2003 | Smits et al. | |
| 2003/0236817 A1 | 12/2003 | Radovic et al. | |
| 2004/0098723 A1 | 5/2004 | Radovic et al. | |
| 2005/0132140 A1 | 6/2005 | Burger et al. | |
| 2006/0080506 A1 | 4/2006 | Rajamony et al. | |
| 2006/0112228 A1 | 5/2006 | Shen | |
| 2006/0143400 A1 | 6/2006 | Steely, Jr. | |
| 2006/0155933 A1 | 7/2006 | Buyuktosunoglu et al. | |
| 2007/0014137 A1 | 1/2007 | Mellinger et al. | |
| 2008/0010415 A1 | 1/2008 | Sawdey et al. | |
| 2009/0043995 A1 | 2/2009 | Abernathy et al. | |

OTHER PUBLICATIONS

Changkyu Kim et al., "An Adaptive, Non-Uniform Cache Structure for Wire-Delay Dominated On-Chip Caches," Proceedings o the 10th International Conference on Architectural Support for Programming Languages and Operating Systems, Oct. 5-9, 2002, San Jose, CA, pp. 1-12.

Hassan Ghasemzadeh et al., "Modified Pseudo LRU Replacement Algorithm," Proceedings of the 13th Annual IEEE International Symposium and Workshop on Engineering of Computer Based Systems, 2006 IEEE, pp. 1-6.

(Continued)

*Primary Examiner* — Son Dinh
(74) *Attorney, Agent, or Firm* — Yuanmin Cai; Khanh Tran

(57) ABSTRACT

Embodiments that dynamically reorganize data of cache lines in non-uniform cache access (NUCA) caches are contemplated. Various embodiments comprise a computing device, having one or more processors coupled with one or more NUCA cache elements. The NUCA cache elements may comprise one or more banks of cache memory, wherein ways of the cache are horizontally distributed across multiple banks. To improve access latency of the data by the processors, the computing devices may dynamically propagate cache lines into banks closer to the processors using the cache lines. To accomplish such dynamic reorganization, embodiments may maintain "direction" bits for cache lines. The direction bits may indicate to which processor the data should be moved. Further, embodiments may use the direction bits to make cache line movement decisions.

19 Claims, 7 Drawing Sheets

OTHER PUBLICATIONS

Jaehyuk Huh et al., "A NUCA Substrate for Flexible CMP Cache Sharing," 19$^{th}$ International Conference on Supercomputing, ISC'05, Jun. 20-25, 2005, Boston, MA, pp. 1-10.

Changkyu Kim et al., "An Adaptive Cache Structure for Future High-Performance Systems," http://domino.watson.ibm.com/acas/w3www_acas.nsf/images/projects_01.02/$FILE/01burger.pdf., pp. 1-2.

Bardine et al., "Way Adaptable D-Nuca Cache," pdf created from html version of cached Google page (http://www.sarc-ip.org/files/foglia/Workshop/Poster%20abstract%20Acaces%202006.pdf), 2006, pp. 1-4.

Naveen Muralimanohar et al., "Interconnect Design Considerations for Large NUCA Caches," http://www.cs.utah.edu/~rajeev/pubs/isca07.pdf, ISCA'07, Jun. 9-13, 2007, San Diego, California, USA, pp. 1-12.

Jaehyuk Huh et al., "Exploring the Design Space of Future CMPs," Proceedings of the 2001 International Conference on Parallel Architectures and Compilation Techniques, Sep. 8-12, 2001, p. 199-210.

U.S. Appl. No. 12/429,622, filed Apr. 24, 2009, Ganesh Balakrishnan et al.

U.S. Appl. No. 12/429,586, filed Apr. 24, 2009, Ganesh Balakrishnan et al.

* cited by examiner

DATA REORGANIZATION IN NON-UNIFORM CACHE ACCESS CACHES

TECHNICAL FIELD

The present invention generally relates to the management of caches of a computing device. More specifically, the invention relates to reorganizing data in non-uniform cache access (NUCA) caches.

BACKGROUND

Cache memories have been used to improve processor performance, while maintaining reasonable system costs. A cache memory is a very fast buffer comprising an array of local storage cells used by one or more processors to hold frequently requested copies of data. A typical cache memory system comprises a hierarchy of memory structures, which usually includes a local (L1), on-chip cache that represents the first level in the hierarchy. A secondary (L2) cache is often associated with the processor for providing an intermediate level of cache memory between the processor and main memory. Main memory, also commonly referred to as system or bulk memory, lies at the bottom (i.e., slowest, largest) level of the memory hierarchy.

In a conventional computer system, a processor is coupled to a system bus that provides access to main memory. An additional backside bus may be utilized to couple the processor to a L2 cache memory. Other system architectures may couple the L2 cache memory to the system bus via its own dedicated bus. Most often, L2 cache memory comprises a static random access memory (SRAM) that includes a data array, a cache directory, and cache management logic. The cache directory usually includes a tag array, tag status bits, and least recently used (LRU) bits. (Each directory entry is called a "tag".) The tag RAM contains the main memory addresses of code and data stored in the data RAM plus additional status bits used by the cache management logic.

Today, many integrated circuit manufacturers are designing chips with multiple processing cores, also known as chip multiprocessors or CMP. The basic idea of CMPs is to extract Thread Level Parallelism, once Instruction Level Parallelism enters the territory of diminishing returns. Increasing the number of processing elements on a chip starts to place severe demands on memory bandwidth because of the many execution contexts that could be all running simultaneously. The memory bandwidth is pin-limited, with the number of pins connecting a chip to the memory chip not growing at the same rate as the number of transistors on a chip nor the number of processors on the chip. Therefore, the bandwidth to memory is starting to become a performance bottleneck.

To alleviate the memory bandwidth bottleneck, large on-die cache memories are needed. Large on-die cache memories are typically subdivided into multiple cache memory banks, which are then coupled to a wide (e.g., 32 bytes, 256 bits wide) data bus. In a very large cache memory comprising multiple banks, one problem that arises is the large resistive-capacitive (RC) signal delay associated with the long bus lines when driven at a high clock rate (e.g., 1 GHz). Further, various banks of the cache may be wired differently and employ different access technologies.

In NUCA caches, the latency to a bank generally depends on the proximity to the device making the request, which frequently is a core or a processor. NUCA takes advantage of the faster response times of banks closer to the processor and allows farther banks to respond slower.

BRIEF SUMMARY

Following are detailed descriptions of embodiments depicted in the accompanying drawings. The descriptions are in such detail as to clearly communicate various aspects of the embodiments. However, the amount of detail offered is not intended to limit the anticipated variations of embodiments. On the contrary, the intention is to cover all modifications, equivalents, and alternatives of the various embodiments as defined by the appended claims. The detailed descriptions below are designed to make such embodiments obvious to a person of ordinary skill in the art.

Some embodiments comprise a method that includes setting direction bits for two separate cache lines. The first cache line may be located in one way of a bank of a NUCA cache, with the second cache line being located in another way of the cache. For the embodiments, the sets are horizontally distributed across the banks of the NUCA cache. In reorganizing data in the NUCA cache to reduce access latency, the embodiments move data of the first cache line to the second bank and data of the second cache line to the first bank. The embodiments move the data based upon a calculation which involves the direction bits for both cache lines.

Further embodiments comprise apparatuses having a latency module and a data movement module to reorganize data in a plurality of banks of a NUCA cache, with ways of the cache being horizontally distributed. For these embodiments, the latency module determines access latencies between the banks and a plurality of processors using direction bits for cache lines of the ways. The data movement module moves data from a first cache line in a first bank to a second bank, as well as move data of the second cache line which was stored in the second bank to the first bank. The data movement module moves data of the first and second cache lines based upon the determined access latencies of the latency module.

Further embodiments comprise alternative apparatuses having a distance module, a benefit calculation module, and a data movement module. The distance module calculates distances between specific banks and specific processors, wherein the specific banks comprise banks of a NUCA cache having sets horizontally distributed across banks. The benefit calculation module performs a calculation using the distances to determine whether moving data of cache lines between the banks will result in a latency benefit. If the benefit calculation module determines that latency will benefit by moving the data of the banks, the data movement module moves data of the cache lines between the banks.

Other embodiments comprise systems for reorganizing data in NUCA caches. The systems comprise a plurality of processors, a plurality of banks of a NUCA cache, and a cache controller. In the embodiments, the cache controller evaluates access latencies between the processors and banks storing cache lines requested by the processors. In performing the evaluations, the cache controller calculates access latencies for pairs of cache lines stored in pairs of banks to determine whether swapping the cache lines between the pairs of banks reduces access latency between one or both of the cache lines and one or more processors that last requested data of the cache lines.

BRIEF DESCRIPTION OF THE SEVERAL VIEWS OF THE DRAWING

Aspects of the various embodiments will become apparent upon reading the following detailed description and upon reference to the accompanying drawings in which like references may indicate similar elements.

DETAILED DESCRIPTION

Figure 1:
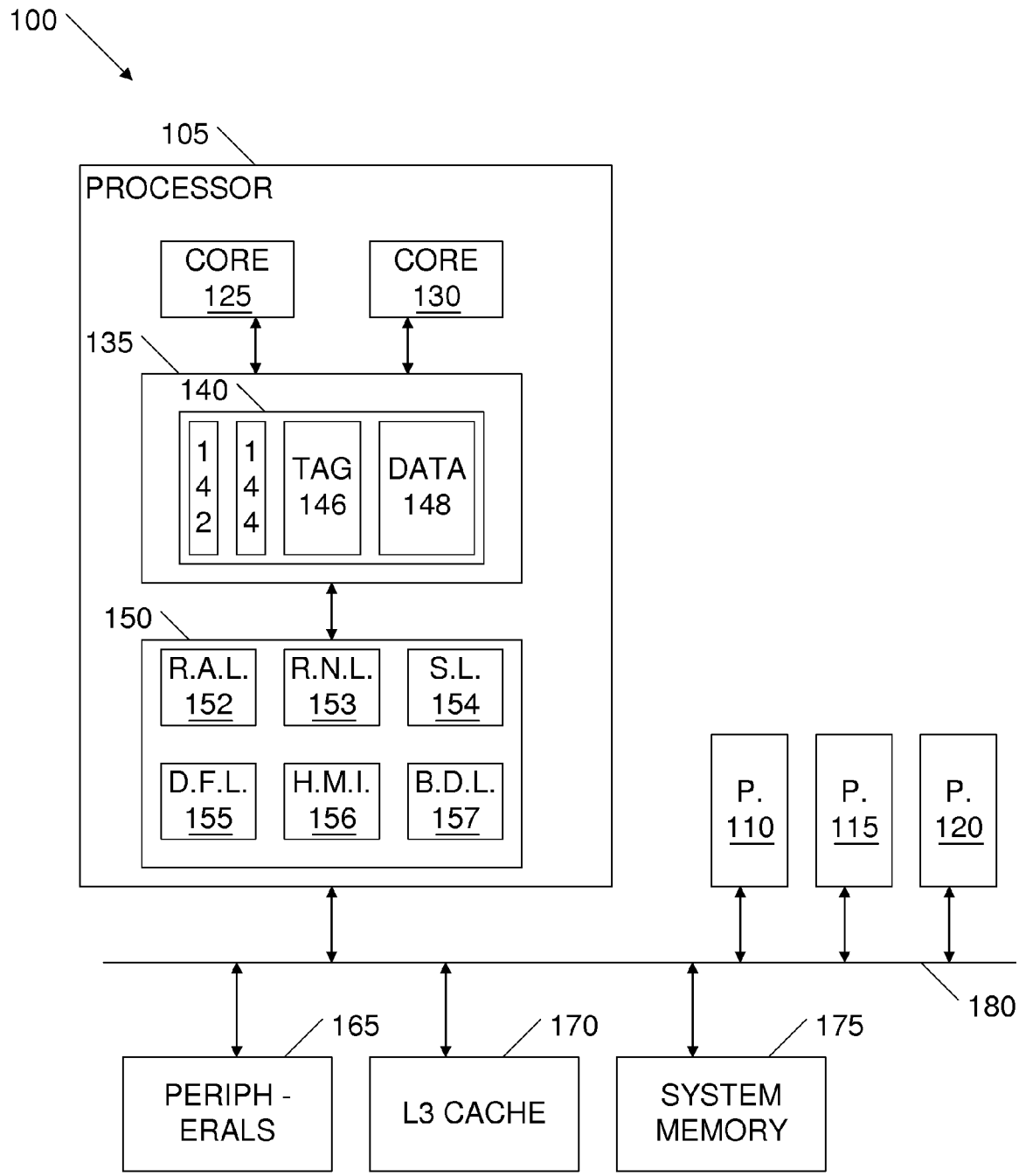
FIG. 1 depicts an embodiment of a system that reorganizes data in a NUCA cache, with the reorganization being requester-sensitive.

The following is a detailed description of novel embodiments depicted in the accompanying drawings. The embodiments are in such detail as to clearly communicate the subject matter. However, the amount of detail offered is not intended to limit anticipated variations of the described embodiments. To the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

In various embodiments, a cache may have many blocks which individually store the various instructions and data values. The blocks in a cache may be divided into groups of blocks called sets or congruence classes. A set may refer to the collection of cache blocks in which a given memory block may reside. For a given memory block, there may be a unique set in the cache that the block can be mapped into, according to preset (variable) mapping functions. The number of blocks in a set generally refers to as the associativity of the cache, e.g. 2-way set associative means that for a given memory block there are two blocks in the cache that the memory block can be mapped into. However, several different blocks in main memory may be mapped to a given set. A 1-way set associative cache is direct mapped, that is, there is only one cache block that may contain a particular memory block. A cache may be said to be fully associative if a memory block can occupy any cache block, i.e., there is one congruence class, and the address tag is the full address of the memory block.

An exemplary cache line (block) may include an address tag field, a state bit field, an inclusivity bit field, and a value field for storing the actual instruction or data. The state bit field and inclusivity bit fields are generally used to maintain cache coherency in a multiprocessor computer system (to indicate the validity of the value stored in the cache). The address tag is usually a subset of the full address of the corresponding memory block. A compare match of an incoming address with one of the tags within the address tag field may indicate a cache "hit". The collection of all of the address tags in a cache (and sometimes the state bit and inclusivity bit fields) is frequently referred to as a directory, and the collection of all of the value fields is often called the cache entry array.

Worth noting, throughout the specification the phrases "distance of a way" and "distance of a cache line" may be used interchangeably. The phrase "distance of a cache line" may be interpreted to mean, "distance of the way in which the cache line resides". A cache line that has a longer access time from a given processor may be said to be "farther away" or that the cache line has a greater "distance" compared to a cache line that is accessible within a shorter access time.

Generally speaking, methods, apparatuses, and systems to reorganize data in non-uniform cache access (NUCA) caches are contemplated. The data reorganization is generally sensitive to the device which last requested it, such as a processor or a core. Various embodiments comprise a computing device, having one or more processors coupled with one or more NUCA cache elements. The NUCA cache elements may comprise numerous banks of cache memory, wherein the ways to the cache are horizontally distributed across multiple banks.

In reducing access latency, the computing devices examine the cache lines in the horizontally distributed sets. Based on distances and/or access latencies between each of the processors and each bank, the computing devices perform calculations to determine or estimate the current access latencies between the cache lines and the processors that last requested data of the cache lines. To determine whether access latency may be reduced, the computing devices generally compare the existing latencies with latencies that would result if data of the cache lines were to be relocated to different ways and/or banks. If swapping the data of different cache lines would result in a reduction of access latency, the computing devices may swap the data between the banks, moving the data of the cache lines closer to the processors that are likely to access the data.

Turning now to the drawings, FIG. 1 depicts a system 100 that reorganizes data in a NUCA cache 135, with the reorganization being requester-sensitive. In numerous embodiments system 100 may comprise a desktop computer. In other embodiments system 100 may comprise a different type of computing device, such as a server, a mainframe computer, part of a server or a mainframe computer system, such as a single board in a multiple-board server system, or a notebook computer. System 100 may operate with different operating systems in different embodiments. For example, system 100 may operate using AIX®, Linux®, Macintosh® OS X, Windows®, or some other operating system. Further, system 100 may even operate using two or more operating systems in some embodiments, such as embodiments where system 100 executes a plurality of virtual machines.

System 100 has four processors, 105, 110, 115, and 120. Different embodiments may comprise different numbers of processors, such as one processor, two processors, or more than four processors. Each processor may comprise one or more cores. For example, processor 105 comprises two cores, 125 and 130, in the embodiment depicted in FIG. 1. Many embodiments may comprise a plurality of cores accessing a plurality of banks of a NUCA cache. As will be illustrated in the discussion for FIGS. 2A through 3D, an embodiment may comprise four, six, eight, or more cores accessing a number of banks of cache.

While not specifically depicted in FIG. 1, cores 125 and 130 may also each comprise L1 cache. System 100 may also have one or more L2 cache elements, such as NUCA cache 135. NUCA cache 135 may comprise a plurality of banks, such as bank 140. Only one bank is shown for the sake of simplicity. In various embodiments of system 100, one or more of the L1 cache and L2 cache structures, as well as L3 cache 170, may comprise NUCA caches. System 100 may reduce latencies for processors, or cores, which access cache lines in banks of the cache by reorganizing data of the cache lines and placing the data closer to the processors or cores that access the data.

NUCA cache 135 may store data and associated tags in a non-uniform access manner. The banks of NUCA cache 135 may be arranged according to a distance hierarchy with respect to core 125 and core 130. The distance hierarchy may refer to the several levels of delay or access time. The access delays may include the accumulated delays caused by interconnections, connecting wires, stray capacitance, gate delays, etc. An access delay may or may not be related to the actual distance from a bank to an access point. The access point may be a reference point from which access times are computed, such as a point of a core or a point distanced half way between two cores. The accumulated delay or access time from the reference point to the bank, or at least a point in the bank, may be referred to as the latency.

The memory banks of NUCA cache 135 may be organized into a number of N-ways, where N is a positive integer, in an N-way set associative structure. The different memory banks in NUCA cache 135 may be laid out or organized into a two-dimensional array. Each of the memory banks may include a data storage device 148, a tag storage device 146, a valid storage device 144, and a replacement storage device 142.

Data storage device 148 may store the cache lines. Tag storage device 146 may store the tags associated with the cache lines. System 100 may use tag storage device 146 to store additional "directional" bits of information for a cache line associated with the core or processor that last accessed the cache line. For example, if core 130 accesses a particular cache line, tag storage device 146 may store a plurality of direction bits that indicate that core 130 was the last core to access data of the cache line. For example, core 125 may have an identification number of "00", while core 130 has an identification number of "01". Upon an access of a cache line by core 130, the direction bits of tag storage device 146 for the cache line may be updated to contain "01". Whenever a data reorganization event is triggered, one or more elements of system 100 may use the identification number in the direction bits to relocate data of the cache line to a bank that is closer to core 130.

Valid storage device 144 may store the valid bits associated with the cache lines. Replacement storage device 142 may store the replacement bits associated with the cache lines. When a valid bit is asserted (e.g., set to logic TRUE), the assertion may indicate that the corresponding cache line is valid. Otherwise, the corresponding cache line may be invalid. Some embodiments may examine the validity bits to determine whether to locate data of the associated cache line. For example, some embodiments may simply exclude invalid cache lines from the reorganization routines. Alternative embodiments may make note of the invalidity, note which processor the bank of the invalid cache line is most closely located, evaluate different combinations of valid cache lines last accessed by that processor, and relocate data of a cache line which may provide the greatest benefit, such as the largest decrease in access latency relative to the most recently used cache line.

When a replacement bit of replacement storage device 142 is asserted (e.g., set to logic TRUE), the assertion may indicate that the corresponding cache line has been accessed recently. Numerous embodiments may include additional state information in replacement storage device 142 to indicate how recently the cache lines were accessed, relative to each other. For example, if NUCA cache 135 comprises a row of eight banks, and each bank has two ways, replacement storage devices for each bank may maintain two sets of four bits that indicate how recently the cache line was accessed relative to the other cache lines of the other banks. For example, if the last two cache lines accessed by cores 125 and 130 are in bank 140, replacement storage device 142 may have one group of bits set equal to "1111" and the other group of bits set equal to "1110" to indicate the most recently used cache line and the next-most recently used cache line, respectively. The groups of bits for the other banks may have values of "1101" through "0000" to indicate how recently the other cache lines were accessed, with "0000" representing the least recently used cache line.

The assertion of replacement bits may also indicate that the corresponding cache line has not been accessed recently. In alternative embodiments, any of the storage devices 148, 146, 144, and 142 may be combined into various numbers of units or into a single unit. For example, the tag and replacement bits may be located together and accessed in serial before the data is accessed. Each bank of NUCA cache 135 may be organized similar to bank 140. In other words, numerous embodiments may have a tag array management system that is distributed among the various banks. Alternatively, in some embodiments, the tag array management system may be centralized. For example, if NUCA cache 135 has sixteen banks, the tag information for the cache lines may be located in a single centralized location, instead of being spread out through various locations of NUCA cache 135.

The processors of system 100 may be connected to other components via a system or fabric bus 180. Fabric bus 180 may couple processors 105, 110, 115, and 120 to system memory 175. System memory 175 may store system code and data. System memory 175 may comprise dynamic random access memory (DRAM) in many embodiments, or static random access memory (SRAM) in some embodiments, such as with certain embedded systems. In even further embodiments, system memory 175 may comprise another type of memory, such as flash memory or other nonvolatile memory.

Processor 105 of system 100, as well as any of processors 110, 115, and 120, represents one processor of many types of architectures, such as an embedded processor, a mobile processor, a micro-controller, a digital signal processor, a superscalar processor, a vector processor, a single instruction multiple data (SIMD) processor, a complex instruction set computer (CISC) processor, a reduced instruction set computer (RISC) processor, a very long instruction word (VLIW) processor, or a hybrid architecture processor.

Processor 105 has a cache controller 150, which may support the access and control of a plurality of cache ways in NUCA cache 135. The individual ways may be selected by a way-selection module residing in cache controller 150. Cache controller 150 may control NUCA cache 135 by using various cache operations. These cache operations may include placement, eviction or replacement, filling, coherence management, etc. In particular, cache controller 150 may perform a non-uniform pseudo least recently used (LRU) replacement on NUCA cache 135. The non-uniform pseudo LRU replacement may comprise a technique to replace or evict cache data in a way when there is a cache miss and tends to move more frequently accessed data/instructions to positions closer to a processor or core. For example, system 100 may detect repeated accesses by a processor and then replicate data of a bank in another bank physically closer to the processor. In this manner, each processor can access the block with reduced latency.

Cache controller 150 may comprise a hit/miss/invalidate detector 156, replacement assert logic 152, replacement negate logic 153, search logic 154, and data fill logic 155 which work in conjunction with benefit detection logic 157. During operation of system 100, benefit detection logic 157 may calculate the latencies and/or distances between cores and banks of NUCA cache 153. Upon finding a pair of banks that may benefit from swapping data of the cache lines contained within the banks, benefit detection logic 157 may work with the other modules of cache controller 150 to swap the data/instructions between the two banks. For example, benefit detection logic 157 may work with data fill logic 155 to buffer the data of a cache line in a first bank, copy the data of a second bank into the first bank, and copy the buffered data to the first bank.

The configuration of cache controller 150 may vary from embodiment to embodiment. Any combination of the modules of cache controller 150 may be integrated or included in a single unit or logic of cache controller 150. Some embodiments of cache controller 150 may contain more or fewer than the above modules or components. For example, in an alternative embodiment, cache controller 150 may also comprise a cache coherence manager.

In various embodiments, the caches of system 100 may be coherent and utilize a coherency protocol. For example, one embodiment may utilize a MESI (modified-exclusive-shared-invalid) protocol, or some variant thereof. Each cache level, from highest (L1) to lowest (L3), may successively store more information, but at a longer access penalty. For example, the on-board L1 caches in processor cores 125 and 130 might have a storage capacity of 128 kilobytes of memory, NUCA cache 135 might have a storage capacity of 1024 kilobytes common to both cores, and L3 cache 170 might have a storage capacity of 8 megabytes (MB). While numerous embodiments may use the techniques of data reorganization as described herein to reduce latency for L2 cache banks, some alternative embodiments may also use the techniques for other hierarchical types of cache. For example, some embodiments may employ a relatively large bank of L1 cache for two closely coupled cores. Alternatively, some embodiments may include banks of L3 cache on the same chip as the L1 and L2 caches.

L1 cache, NUCA cache 140, and/or L3 cache 170 may include data or instructions or both data and instructions. One or more of the caches may comprise fast static random access memory (RAM) devices that store frequently accessed data or instructions in a manner well known to persons skilled in the art. The caches may contain memory banks that are connected with wires, traces, or interconnections. As noted previously, the wires or interconnections introduce various delays. The delays may be generally non-uniform and depend on the location of the memory banks in the die or on the board. As will be illustrated, system 100 may take into account the various delays when determining which banks of the NUCA caches may offer reduced latency access by reorganizing the data of the banks.

The processors of system 100 may be connected to various peripherals 165, which may include different types of input/output (I/O) devices like a display monitor, a keyboard, and a non-volatile storage device, as examples. In some embodiments, peripherals 165 may be connected to fabric bus 180 via, e.g., a peripheral component interconnect (PCI) local bus using a PCI host bridge. A PCI bridge may provide a low latency path through which processors 105, 110, 115, and 120 may access PCI devices mapped within bus memory or I/O address spaces. Cache controller 150 may be configured to interact with peripherals connected to the PCI host bridge. For example, cache controller 150 may receive data from and send data to storage devices coupled to PCI slots. Cache controller 150 may reorganize the data of the banks during operation and periodically write the contents back out to the data storage devices.

A PCI host bridge may also provide a high bandwidth path to allow the PCI devices to transfer data to and from system memory 175. Such PCI devices may include, e.g., a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices.

Figure 2A:
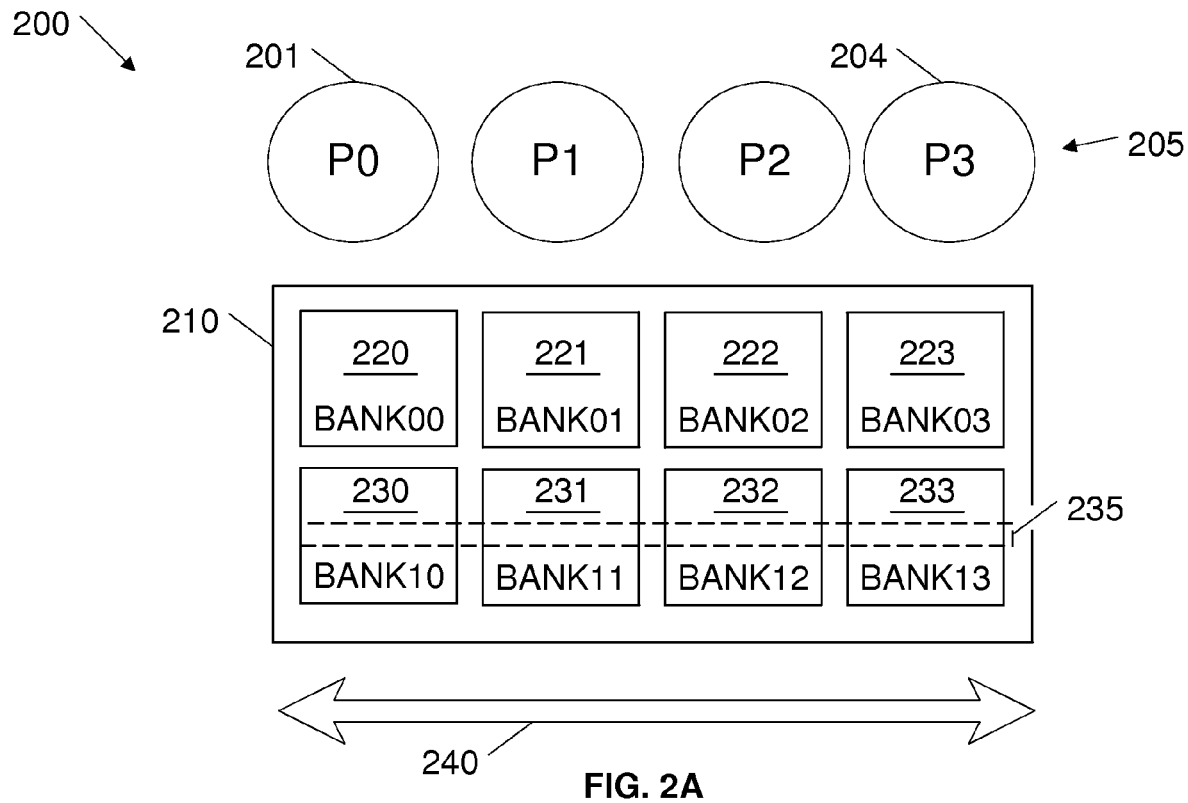
FIGS. 2A-2B illustrate how ways, or sets of ways, of a NUCA cache may be horizontally distributed across banks of the cache and include additional state information for cache lines to help determine which direction data of the lines should move to reduce latency.
Figure 2B:
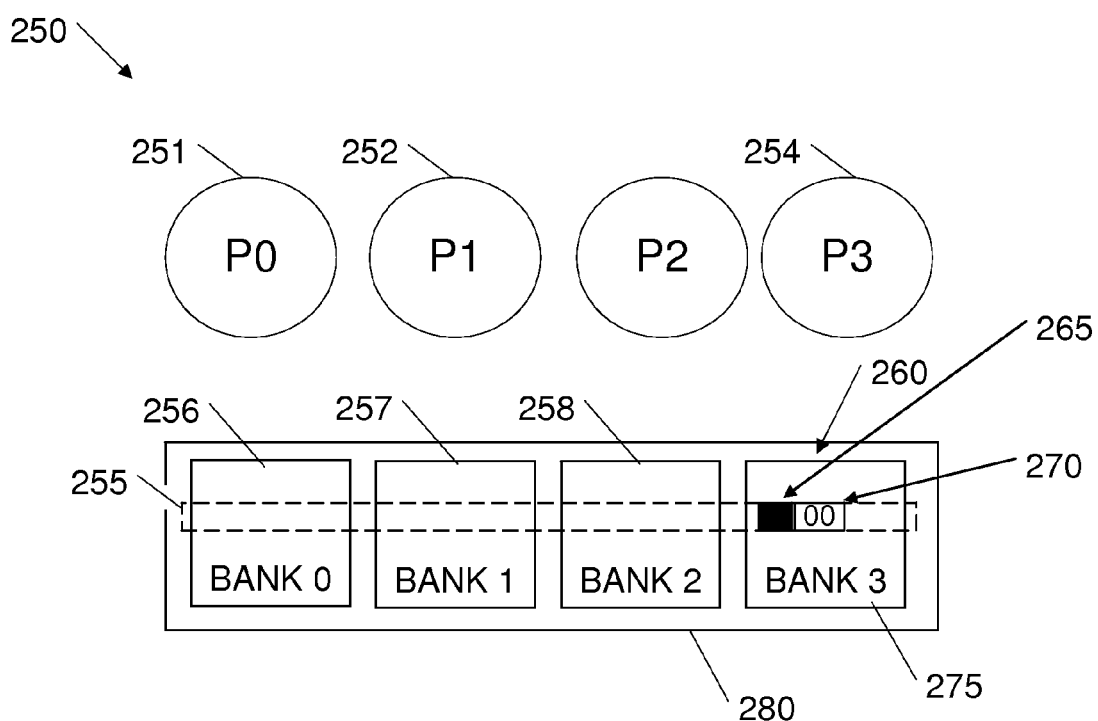

FIGS. 2A and 2B illustrate how ways, or sets of ways, of a NUCA cache may be horizontally distributed across banks of the cache. In FIG. 2A, a system 200 comprises four processors 205. As noted previously, alternative embodiments may comprise more or fewer processors. As shown, system 200 has four processors. In general, alternative systems and apparatuses may comprise a plurality of processors. Additionally, depending on the embodiment and/or technology, one or more of the processors may be replaced by cores. As illustrated in FIG. 2A, each of processors 205 may be coupled with a large multi-banked lower level cache 210. Cache 210 may comprise a horizontally striped NUCA cache.

Cache 210 may comprise an n-way set associative cache, wherein cache blocks are grouped into sets, with each set comprising a number, n, of cache blocks or ways that are searched in parallel for cache hits. Apart from being logically organized into ways and sets, cache 210 is physically organized into a number of different banks. More specifically, cache 210 comprises eight banks, banks 220 through 223, and banks 230 through 233.

For cache 210, the ways of a cache set, such as set 235, are distributed across banks, rather than being all in one bank. Spreading ways across multiple banks allows cache lines in a given cache set to reside in one of many banks, some closer to a given processor and some farther away. Depending on which bank a certain cache set maps to, access to that set could be much slower compared to a different set in a NUCA cache. However, contrasted with vertically striped sets, in which there may generally be a clear notion of "near" and "far" for banks relative to processors, horizontally striped sets present a problem.

To further illustrate the problem that horizontally striped caches present, cache 210 may comprise a microarchitecture wherein a given bank is at a different distance from one processor compared to another. In other words, a given cache bank in a shared cache has different distances from different processors. Bank 220 is the nearest to processor 201, while bank 233 is the farthest from processor 201. However, for set 235 spread across banks 230, 231, 232, and 233, bank 230 is the nearest and bank 231 the farthest from processor 201. As FIG. 2A illustrates, a bank that is close to one processor may be significantly farther away from another.

To further complicate matters, another problem that needs to be addressed for horizontally striped caches is a problem related to the frequency of access to cache lines. For example, a cache line may be accessed by processor 201 for certain period of time, yet be accessed by processor 204 at a later time, such as the case with an operating system performing multithreading. Having two processors access the same cache line may create a problem when trying to determine where to "promote" or move the cache line.

The importance of a cache line within a cache set may be measured by considering more recently-used or more often-used lines to be more important. Many embodiments may use an algorithm like the Least Recently Used (LRU) algorithm to determine the relative importance of cache lines with a set. Unfortunately with horizontal striping, the MRU cache line corresponding to one processor might need to be in the same bank as the LRU cache line corresponding to another processor. As will be illustrated with the discussion of FIG. 2B, embodiments may address this LRU-MRU problem by including additional state information for the cache lines. The embodiments may provide solutions that implement horizontally striped sets in a NUCA cache that works in a multi-processor shared-multi-bank-cache design where the cache access latency depends not only on the bank being accessed but also the processor that is accessing the bank.

Additionally, one may note that sets in bank row 1 (banks 230, 231, 232, and 233) are always farther away than sets in bank row 0 (banks 220, 221, 222, and 223). To minimize the access latency for banks that are physically located farther from the processors, as well as reduce the access latency for banks that are closer to the processors, system 200 may include additional state information for cache lines to help determine which direction data of the cache lines should move to reduce access latency. For example, data of a cache line frequently accessed by processor 201 may be moved from bank 233 to bank 230.

FIG. 2B illustrates how cache lines in banks may include additional state information to help determine which direction data of the cache lines should move to reduce latency. System 250 has a set 255 spread across multiple banks of a NUCA cache 280. Bank 275 has a way 260 that contains bits 265, wherein bits 265 may comprise data, tag, and state information for a cache line of way 260.

System 250 and other embodiments may maintain "direction bits" for each cache line to keep track of the direction in which a cache line prefers to move. For example, in addition to bits 265 the cache line for way 260 may also have extra state information, such as direction bits 270, to remember which processor asked for the cache line last. As a specific example, direction bits 270 equaling "00" may indicate that processor 251 was the last processor of system 250 to ask for the cache line.

By comparing the current location of the cache line and the location of the bank where the cache line would be closest to the processor that last requested the line, a system may determine the direction the cache line needs to be moved to reduce access latency. Continuing with the previous example, if a given cache line is located in bank 275 and processor 251 asked for the cache line last, system 250 may infer that moving the cache line toward processor 251, when given an opportunity, may reduce the access latency for future accesses of the cache line by processor 251.

Alternative embodiments may comprise additional bits for cache lines to convey additional information that may be used in determining where cache lines should be moved. For example, some embodiments may include "magnitude" bits in addition to direction bits. For example, while the direction bits may indicate that a cache line should be moved to the left of the bank in which it is currently stored, the magnitude bits may indicate that the cache line should be moved left by two banks in order to place the data next to the processor that last requested it.

FIG. 2B illustrates that state bits, comprising bits 265 and direction bits 270, may be maintained in the bank storing the cache line. At least one embodiment may access the state information of each cache line when determining the direction and/or distance that a cache line should be moved to reduce latency. However, many embodiments may also maintain the direction bits at a centralized location to avoid having lookups unnecessarily access multiple banks.

Aside from illustrating in which direction a cache line may need to move to reduce latency, FIG. 2B also illustrates the magnitude, or how far, a cache line may need to move. The NUCA architecture of systems 200 and 250 lend themselves to the definition of a "distance" for each way with respect to each processor. In various embodiments, the distance may be assumed to be directly proportional to the number of banks the processor access has to hop across to get to the bank the processor is accessing. For example, as shown in FIG. 2B, the distance from processor 251 to bank 256 is assumed to be 0; processor 251 to bank 257 is 1; processor 252 to bank 275 is 2; and processor 254 to bank 256 is 3.

While FIG. 2B shows one bank per processor, various embodiments may not have a one-to-one correlation between the bank identification and the processor identification. For example, in FIG. 2B, there could be 8 processors and 4 banks, or 4 processors and 8 banks. In embodiments were the number of banks is larger than the number of processors, the calculation of the distance may be slightly more involved.

More formally, distance may be defined as: dist(Wi, Pj)=distance of bank holding way i from the bank closest to processor j=|B(Wi)−B(Pj)|. B(Wi) is the bank that holds the way i, and B(Pj) is the bank that is closest to processor j. In embodiments where two or more banks are relatively close to processor j, such as embodiments having more banks than processors, the bank closest to way i may be used for the calculation. Using the direction bits of a cache line, coupled with information pertaining to the processor and bank geometry, a cache controller may determine the distance from a way to the processor that requests access.

By calculating distance, access latency may generally be inferred from the distance. In cases where latency may not necessarily be related to distances, such as designs where buffers for only some banks may be involved, the cache controller may need to determine access latency via another method, instead of using only distance. For example, some embodiments may have a delay value associated with each processor-way combination. In calculating delay, the cache controller may determine the access delays for processor-way combinations by, e.g., pulling the delay values from a lookup table.

Figure 3A:
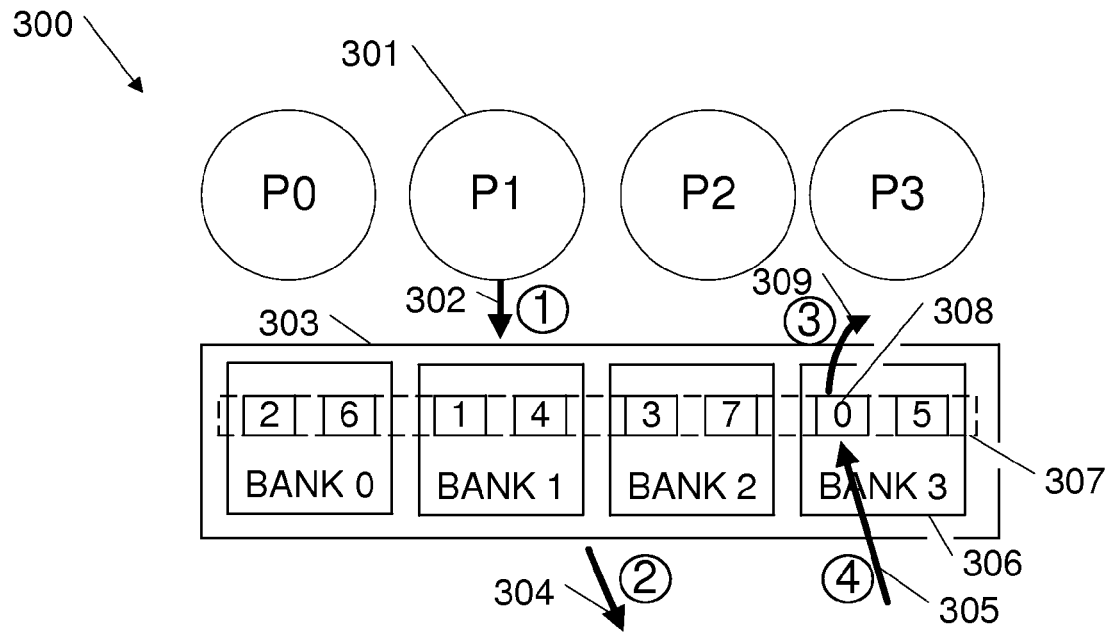
FIGS. 3A-3D illustrate how banks of cache lines may be stored upon cache misses and hits, as well as how data of cache lines may be reorganized to reduce latency.

FIGS. 3A-3D illustrate how banks cache lines may be stored upon a cache miss, as well as how data of cache lines may be reorganized to reduce latency. FIG. 3A, illustrates how an embodiment of a system 300 may handle a cache miss. Processor 301 of system 300 may make a request 302 for a cache line from NUCA cache 303. If the cache line is not in NUCA cash 303, the request 302 will result in a cache miss 304. In response to the miss 304, system 300 may determine which cache line of set 307 has been least recently used. FIG. 3A shows that each bank of NUCA cache 303 has two ways. FIG. 3A also shows that cache lines of the ways may each be assigned an LRU value. For example, the cache line of way 308 has a value of zero. An LRU value of zero for the cache line may mean that the cache line was the least recently used cache line of set 307. A value of seven for a cache line may indicate that the cache line was the most recently used cache line of set 307.

Upon determining that the cache line of way 308 in bank 306 was the least recently used cache line of set 307, system 300 may remove (element 309) the least recently used cache line. For example, system 300 may write the contents of the cache line to system memory if the data of the cache line is dirty. System 300 may then install the incoming (element 305) cache line, corresponding to miss 304, into way 308.

Figure 3B:
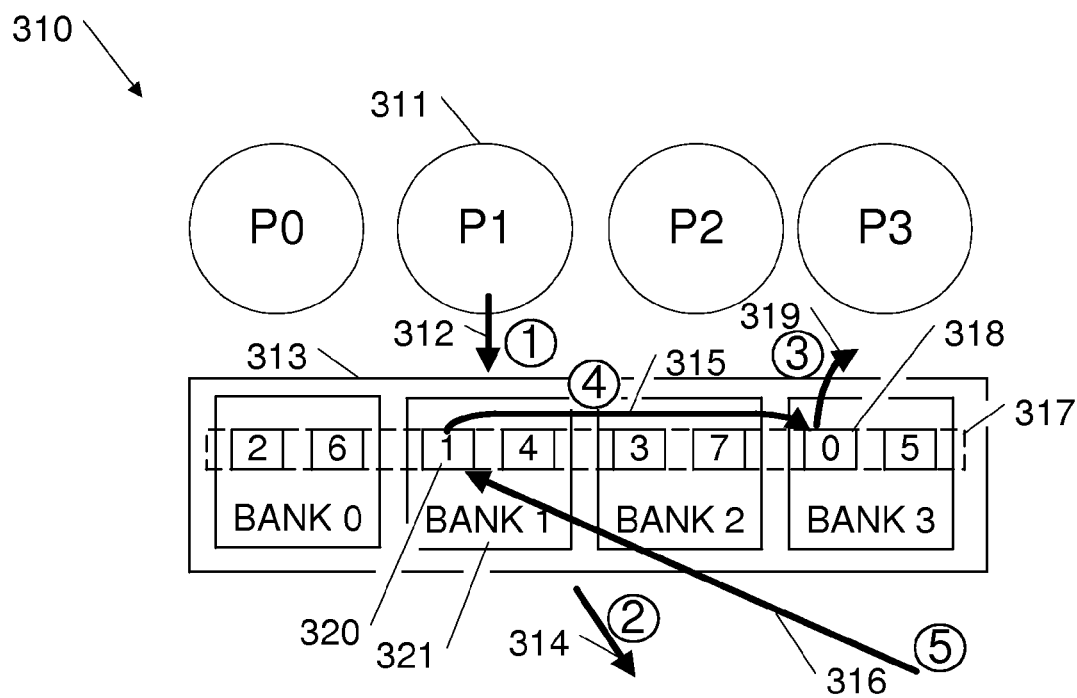

FIG. 3B illustrates how an alternative embodiment of a system 310 may handle a cache miss. Processor 311 of system 310 may make a request 312 for a cache line from NUCA cache 313. If the cache line is not in NUCA cache 313, the request 312 will result in a cache miss 314. In response to the miss 314, system 310 may determine which cache line of set 317 has been least recently used. Similar to the system of FIG. 3A, FIG. 3B shows that each bank of NUCA cache 313 also has two ways.

FIG. 3B also shows that the cache line least recently used is the cache line of way 318. However, instead of writing the cache line corresponding to miss 314 directly into way 318, system 310 may determine the least recently used cache line of the bank closest to the requesting processor 311, which is bank 321. System 310 may determine that the cache line of way 320 has an LRU value one, which means that the cache line is the next least recently used cache line after the cache line of way 318. Consequently, system 310 may evict the least recently used cache line from way 318, writing data of the cache line to system memory if necessary, and transfer or move (element 315) the data of the cache line in way 320 to way 318. System 310 may then install the incoming (element 316) cache line, corresponding to miss 314, into way 320.

Figure 3C:
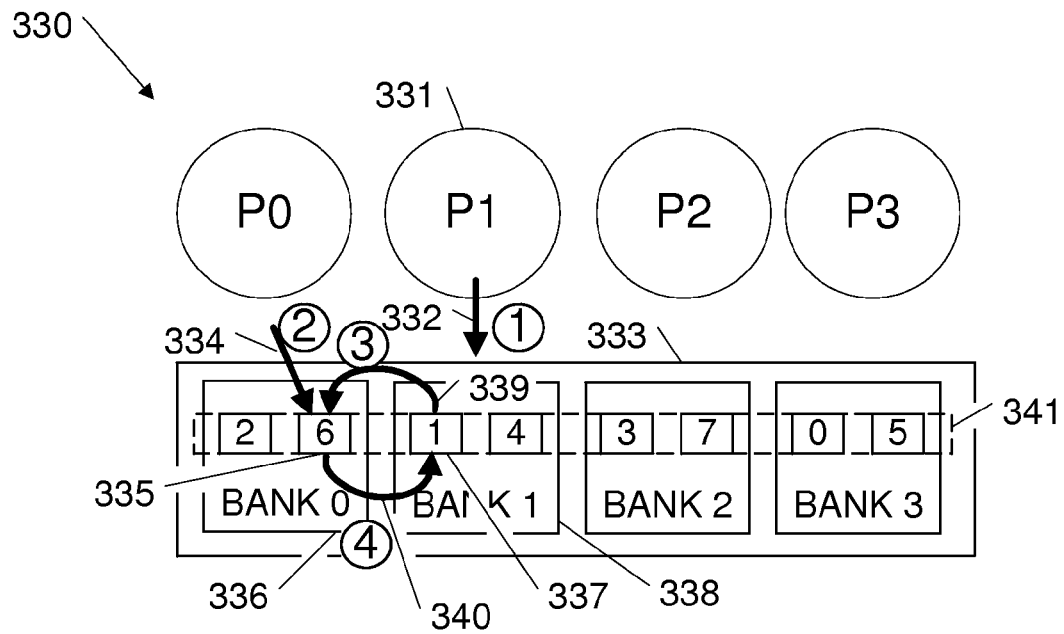

FIG. 3C, illustrates how an embodiment of a system 330 may handle a cache hit. Processor 331 of system 330 may make a request 332 for a cache line from NUCA cache 333. System 330 may receive a hit 334 for request 332, determining that the requested cache line is in way 335 of bank 336. System 330 may also determine that bank 336 is not the closest bank to processor 331. Consequently, system 330 may determine which cache line of bank 338 has been least recently used. FIG. 3C shows that the cache line of way 337 in bank 338 was the least recently used cache line, because an LRU value of one is less than four. To reduce access latency, system 330 may move (element 339) the data from way 337 to way 335 and move (element 340) data from way 335 to way 337. Moving the data of the requested cache line from way 335 to way 337 places the data closer to processor 331 and reduces access latency.

Upon receiving the hit 334 and relocating the data for the hit 334 to a bank closer to the requesting processor 331, system 330 may perform a variety of housekeeping tasks. For example, system 330 may update bits in a partial tag array and update other status bits for set 341, such as updating the direction bits and the LRU value bits for the cache lines of set 341.

Figure 3D:
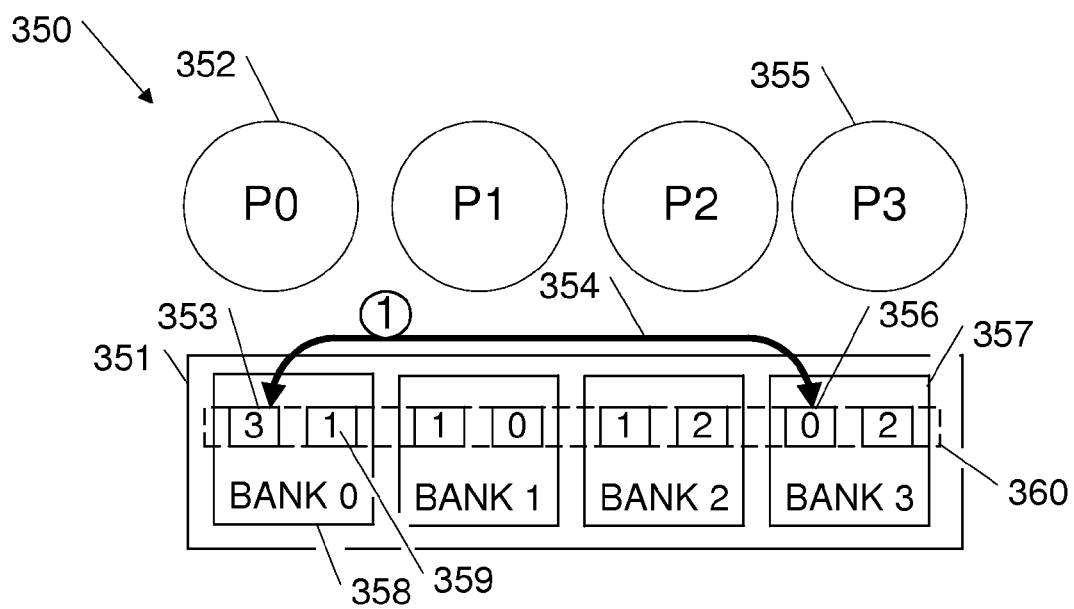

FIG. 3D, illustrates how an embodiment of a system 350 may reorganize data of cache lines in a NUCA cache 351. For example, a cache controller of system 350 may periodically reorganize data of each of the sets in NUCA cache 351 according to an algorithm, at times other than when responding to a processor request. A system may need to reorganize data of a NUCA cache 351 for a variety of reasons. One reason may be due to the scheduling of the operating system, which can schedule threads to cores independent of where the threads were last executed.

In different embodiments, a system or apparatus may reorganize data at various times and in various ways. In some embodiments, system 350 may reorganize data periodically, such as after a fixed or programmable number of cycles. In alternative embodiments, system 350 may reorganize data after a certain number of cache accesses, such as after a number of hits or misses, including embodiments where the number of cache accesses is static and/or programmable. In even further alternative embodiments, system 350 may reorganize data during times of low cache activity.

Different embodiments may select different amounts of data to reorganize. For example, some systems may reorganize the data of several sets of a NUCA cache simultaneously. Other systems may only reorganize the data of a single set at a time. In even further embodiments, a system may continually evaluate the arrangement of the cache lines in a set, yet reorganize data after a fixed number of accesses to the set, if required. Reorganizing the data after a fixed number of accesses may help ensure that a system attempts reorganization when there is a chance that the access patterns to a given cache set could have changed, unlike reorganizing periodically. Systems or apparatuses may perform the reorganization, or data movement, outside the critical path. Further, the systems or apparatuses may prefer to reorganize the data in a manner that does not make the data in the cache set unavailable during the reorganization.

Figure 5:
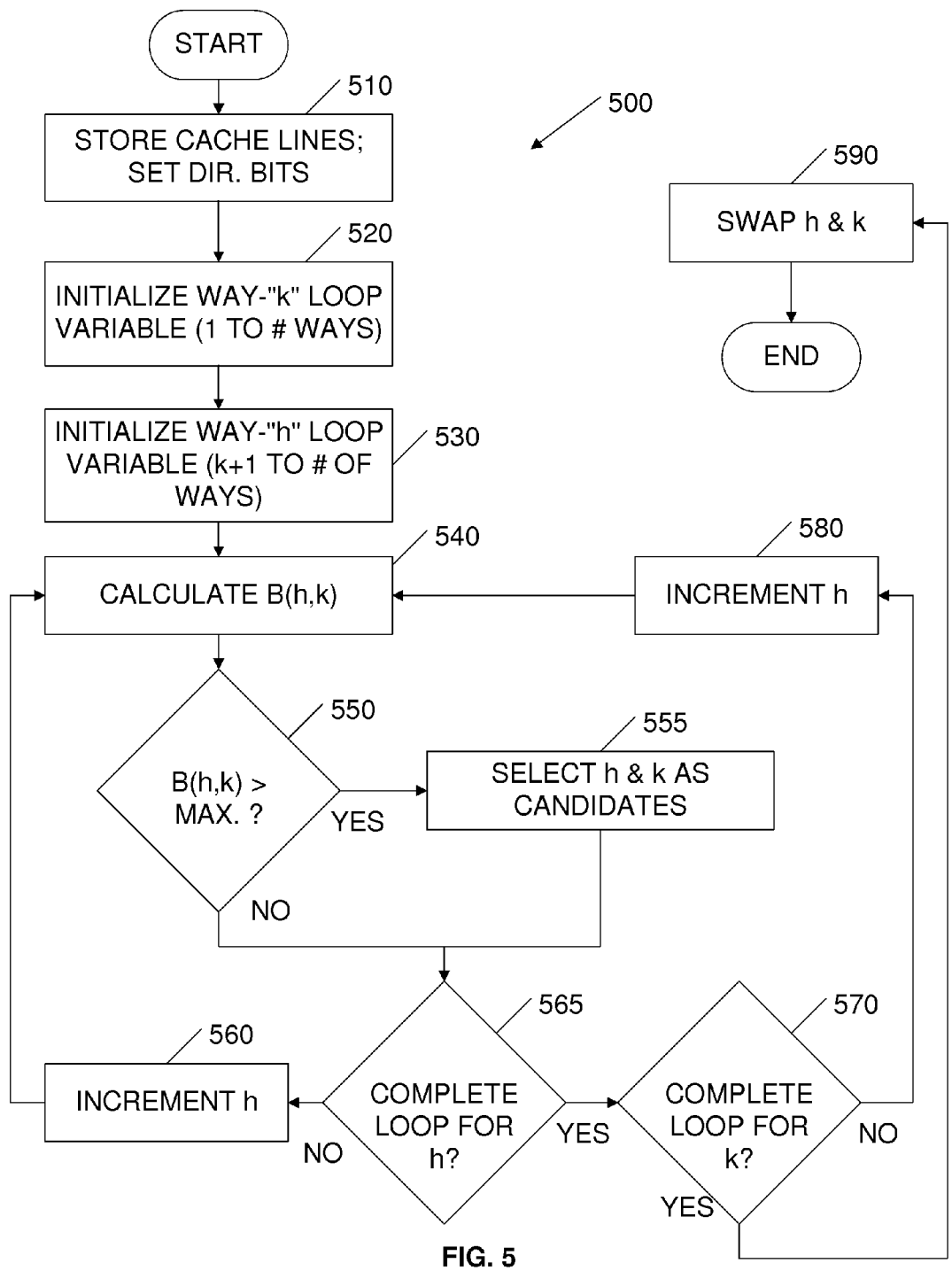
FIG. 5 depicts a flowchart illustrating how an embodiment may iteratively examine pairs of cache lines stored in a plurality of banks of a NUCA cache, determine a benefit of swapping data of one pair of cache lines, and swap data of the pair.

To illustrate how an apparatus or system, such as system 350, may reorganize data of a NUCA cache, one may study FIG. 5. FIG. 5 depicts a flowchart 500 illustrating how an embodiment may reorganize data of a set of a NUCA cache. For example, system 350 may exchange two cache lines per reorganization attempt for set 360 of NUCA cache 351. Exchanging two cache lines per reorganization may help minimize data movement and power consumption of system 350, while still allowing data of the cache sets to approach a more optimal data layout.

Flowchart 500 may comprise a pictorial representation of the following pseudocode, which may be performed by a state machine of a cache controller in system 350.

```
A = number of ways in the cache set (set associativity)   //line 1
max_benefit = 0;                                           //line 2
for k=1 to A in the selected set{                          //line 3
    for h=k+1 to A in the selected set {                   //line 4
        B(h,k) = [dist(h,D(h)) + dist(k,D(k))] -           //line 5
                 [dist(k,D(h)) + dist(h,D(k))]
        if (B(h,k) > max_benefit){                         //line 6
            candidate_h = h;                               //line 7
            candidate_k = k;                               //line 8
        }                                                  //line 9
    }                                                      //line10
}                                                          //line 11
```

As for notation used in flowchart 500 and the pseudocode, D(i) may represent the direction bits of way i. In other words, D(i) may indicate which processor will most likely request the cache line in way i again. B(h,k) may represent the "benefit" of a way-exchange between ways h and k. For example, the benefit may measure the reduction in distance and/or access latency.

As illustrated in FIG. 5, system 350 may store cache lines and set direction bits for NUCA cache 351 during operation (element 510). When prompted to perform a reorganization event, system 350 may initialize the first variable corresponding to one of the way candidates (element 520). Referring to the pseudocode, such initialization may correspond to line 3. System 350 may initialize a second variable corresponding to a second way candidate (element 530). Again referring to the pseudocode, such initialization may correspond to line 4.

Upon initializing the way candidate variables, system 350 may then perform an iterative analysis involving all of the cache lines in set 360. For example, system 350 may first select the cache lines of way 356 and way 359. System 350 may determine whether exchanging the data of way 356 with way 359 will result in a net benefit for access latency (element 540 and line 5). In other words, system 350 may determine whether exchanging the data between the two ways will place the data of at least one way closer to the processor that last requested it (element 540 and line 5). If the overall access latency for the two cache lines will be reduced (elements 550 and line 6), system 350 may designate way 356 and way 359 as candidates for data reorganization (element 555 and lines 7 & 8).

System 350 may then compare way 356 with other ways of set 360 (elements 565 & 560 and loop of lines 4 & 10), trying to determine if exchanging data of the ways may result in a reduction of access latency (elements 540 & 550). System 350 may then compare way 359 with other ways of set 360 (elements 570 & 580 and loop of lines 3 & 11), trying to determine if exchanging data of the ways may result in a reduction of access latency (elements 540 & 550). Alternatively describing the benefit B(h,k) that system 350 is calculating, system 350 is calculating [Current distance (Way h)+Current distance (Way k)]-[New distance (Way h)+New distance (Way k)].

Upon performing the benefit calculation for the other ways of set 360, system 350 may determine that swapping the data of two other ways provides a greater benefit (element 550). Consequently, system 350 may then designate those ways as candidates for data reorganization (element 555 and lines 7 & 8). For example, processor 352 may have been the last processor to request a cache line of way 356. Further, processor 355 may have been the last processor to request a cache line of way 353. As FIG. 3D illustrates, exchanging the data of ways 356 and 353 may provide a relatively large benefit because the number of banks which must be traversed in order to access the data (three in this example) is decreased for both processors. Because exchanging the data of ways 356 and 353 may provide a larger benefit than any of the other ways of set 360, system 350 may replace any other previous way candidates with ways 356 and 353 (element 555 and lines 7 & 8).

Upon iteratively analyzing all of the ways of set 360 and choosing the best candidates for way-exchange, system 350 updates the direction bits for the ways involved in the exchange 354 and exchanges the data and tags (element 590).

Flowchart 500 of FIG. 5 illustrates only one process that a system may perform when reorganizing data of ways/banks of a set. Alternative embodiments may implement innumerable variations of flowchart 500. For example, some alternative embodiments may not perform one or more functions illustrated by flowchart 500, such as an embodiment that only analyzes half of the ways of a set during an evaluation period. Other embodiments may not iteratively analyze ways of a set, such as an embodiment that only analyzes a limited number of the most recently used cache lines. Further alternative embodiments may perform actions in addition to the actions illustrated in FIG. 5, while even further alternative embodiments may eliminate or avoid other functions taught by flowchart 500.

Figure 4A:
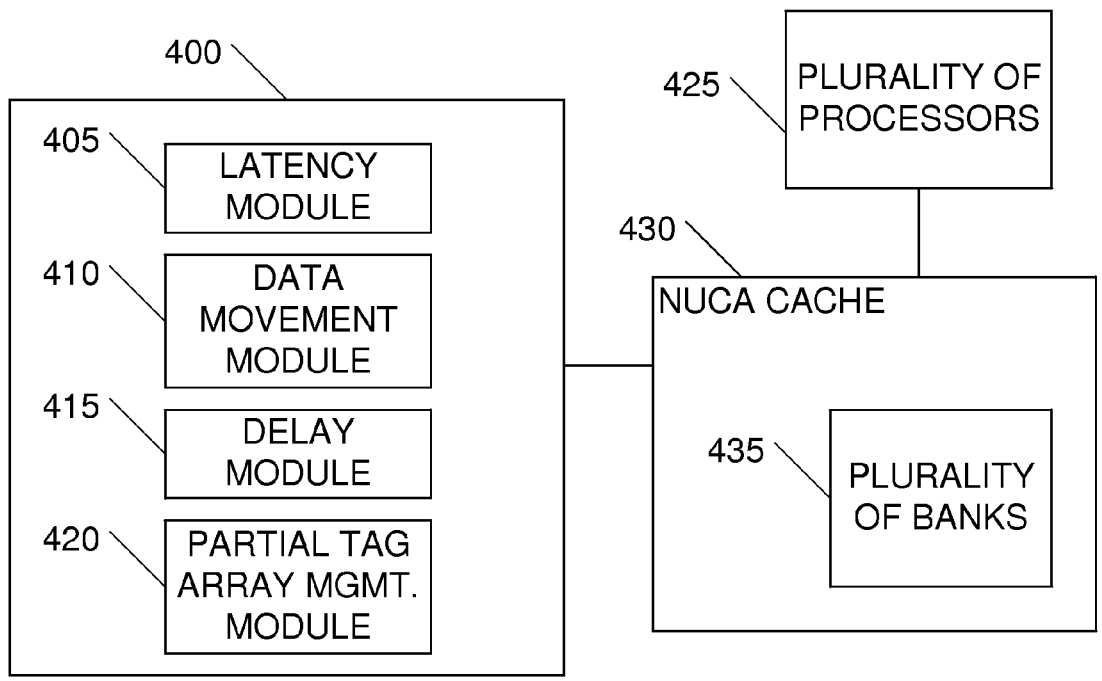
FIG. 4A depicts an apparatus configured to reorganize data in shared NUCA caches, comprising a latency module, a data movement module, a delay module, and a partial tag array management module.
Figure 4B:
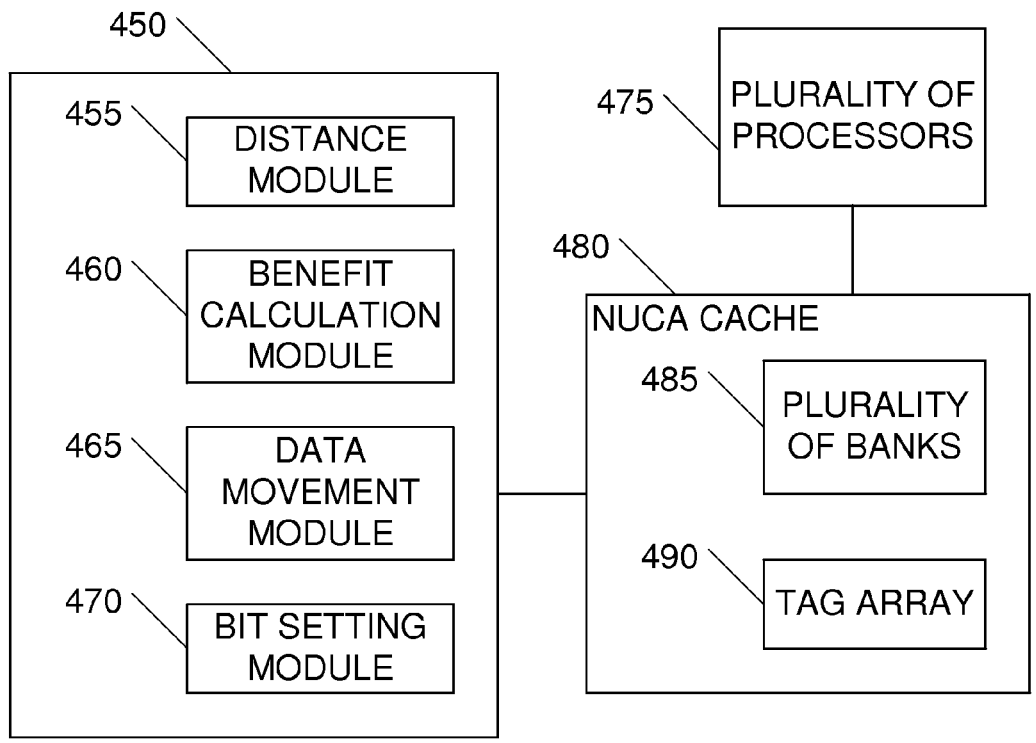
FIG. 4B shows an alternative embodiment of an apparatus for reorganizing data in a NUCA cache comprising a distance module, a benefit calculation module, a data movement module, and a bit setting module.

FIGS. 4A and 4B show two different embodiments of apparatuses for reorganizing data in NUCA caches. FIG. 4A depicts an apparatus 400 configured to reorganize data in a shared NUCA cache 430, comprising a latency module 405, a data movement module 410, a delay module 415, and a partial tag array management module 420. FIG. 4B shows an alternative embodiment of an apparatus 450 configured to reorganize data in a NUCA cache 480, comprising a distance module 455, a benefit calculation module 460, a data movement module 465, and a bit setting module 470.

One or more elements of the apparatuses in FIGS. 4A and 4B may be in the form of hardware, software, or a combination of both hardware and software. Some modules may comprise software or firmware instructions of an application, executed by one or more processors. For example, benefit calculation module 460 of apparatus 450 may exist as an instruction-coded module stored in a memory device, executed by an integrated processor of a cache controller. In alternative embodiments, one or more of the modules of the apparatus in FIGS. 4A and 4B may comprise hardware-only modules. For example, one or more of the modules of apparatus 400 or apparatus 450 may comprise state machines formed into an integrated circuit chip coupled with a NUCA cache.

NUCA caches 430 and 480 may comprise horizontally-striped NUCA caches. In other words, NUCA cache 430 and 480 may each contain a plurality of banks (435 and 485) wherein ways are horizontally distributed across multiple banks. As a specific example, either NUCA cache 430 or NUCA cache 480 may correspond to NUCA cache 210 depicted in FIG. 2A. Eight banks is only one embodiment, as the number of banks of a NUCA cache may vary from embodiment to embodiment. For example, an alternative embodiment may comprise 4, 16, 32, or 64 banks, as examples.

NUCA caches 430 and 480 may each be coupled to a plurality of processors (425 and 475). For example, system 200 has four processors 205 coupled to NUCA cache 210. One should note that even though the embodiments of FIGS. 2A-2B and FIGS. 3A through 3D have a one-processor-to-one bank correspondence, alternative embodiments may not have such one-to-one correspondence. For example, one embodiment may have four processors coupled to an array of banks that is eight banks wide and twelve banks deep (eight horizontal columns by twelve horizontal rows). Stated differently, the row of the four processors may face a row of eight banks. In a worst-case scenario for this embodiment, if all four processors are arranged like the processors of FIGS. 2A-2B, a processor on the end of the processor row may have to horizontally traverse seven banks and vertically traverse eleven banks down to access data of the bank farthest from that processor. Further, while the descriptions of embodiments thus far have applied to rectangular (2 dimensional) layouts of cache banks with linear (1 dimensional) layouts of processors, the teachings disclosed for the various embodiments may nonetheless be extended to more complex layouts of processors and caches, with different heuristics to define nearness.

In various embodiments, multiple banks may need to be accessed to search for a cache line, even after identifying the cache set. Also, multiple banks might need to be accessed when a new line is brought into the cache and installed. Embodiments may comprise hardware that helps reduce the amount of effort that an embodiment exerts when locating a cache line. For example, apparatus 400 has partial tag array management module 420.

When performing a cache lookup, apparatus 400 may avoid having to look up all the banks that make up a cache set in NUCA cache 430, which is time-consuming, by using partial tag array management module 420 to maintain a centralized partial tag array of NUCA cache 430. For example, NUCA cache 430 may comprise a tag array, such as tag array 490 shown in FIG. 4B. The tag array may assist partial tag array management module 420 in filtering out many unnecessary accesses to the banks. Only when apparatus 400 finds a partial tag match for a cache line will apparatus 400 search the corresponding bank looked up for the full tag match.

Some embodiments may employ use a centralized partial tag match unit which holds a short, hashed, version of the tag bits corresponding to the cache lines in the overall cache. However, in other embodiments, a centralized partial tag scheme may unacceptably restrict bandwidth. For embodiments where a centralized partial tag array would be a bandwidth bottleneck for cache access, such embodiments may instead employ a distributed partial tag array.

A lookup of a partial tag array may reduce the number of bank accesses required to search for a cache line. Embodiments may often identify a miss without accessing any of the banks, when the partial tag array guarantees that the line being looked for is not in the cache. Upon a cache miss, the embodiments may choose a replacement candidate cache line and bring in the line from the lower level of memory hierarchy.

Latency module 405 may use direction bits of cache lines in NUCA cache 430 to determine access latencies between plurality of processors 425 and plurality of banks 435. For example, with reference to FIG. 2B, latency module 405 may use direction bits 270 to determine the access latency between bank 275 and processor 251. Upon determining that direction bits 270 contain a value of zero, which corresponds to the processor identification number for processor 251, latency module 405 may determine the latency between bank 275 and processor 251 by determining the number of banks that must be traversed to access the data. For example, latency module may multiply a certain number of nanoseconds by a factor of three, wherein the factor corresponds to banks 256, 257, and 258. The product of the delay time and the multiplication factor may comprise, or at least approximate, the access latency between processor 251 and bank 275.

Alternatively, in different embodiments, latency module 405 may determine access latencies via the direction bits in different manners. For example, one embodiment may determine access latencies by performing a lookup of a delay table that lists values of delay for each of the banks relative to each processor. Continuing with our example from above, latency module 405 may determine the direction bits contain a value of zero, which again corresponds to the processor identification number for processor 251, and use the processor identification number to look up, from a table, an amount of delay for bank 275 by accesses of processor 251.

Latency module 405 may calculate the access latencies for all of the cache lines in a set of plurality of banks 435 to determine which two cache lines may offer the greatest amount of benefit by swapping the data of the associated ways. Upon selecting the two cache lines for the exchange, data movement module 410 may perform the actual exchange of data between the two banks. For example, with reference to FIG. 3D, data movement module 410 may perform the exchange 354 of data between ways 356 and 353 of banks 357 and 358, respectively. Apparatus 400 may also include delay module 415 to determine when latency module 405 performs the latency calculations. For example, delay module 415 may use a counter or a timer to enable intervals of time to elapse between calculations of access latencies. Such delay in may help prevent premature movements of data that may need to be relocated back to their current banks.

The alternative embodiment of apparatus 450 depicted in FIG. 4B may reorganize data in NUCA cache 480 in a different manner than apparatus 400 of FIG. 4A. Distance module 455 may use the direction bits to calculate distances between one or more processors of plurality of processors 475 and ways of plurality of banks 485. For example, with reference to FIG. 2B, distance module 455 may use bits of a cache line in bank 256 to determine that processor 254 was the last processor to request the cache line. Distance module 455 may also use direction bits 270 to determine that processor 251 was the last processor to request the associated cache line of bank 275.

Distance module 455 may then calculate the distance between bank 275 and processor 251 as well as the distance between bank 256 and processor 254. In other words, distance module 455 may calculate the distances between the banks and the processors that last accessed the cache lines of those banks. Distance module 455 may also calculate the distance between bank 275 and processor 254 as well as the distance between bank 256 and processor 251. In other words, distance module 455 may use the distance bits of both banks to determine the distances, between the cache lines and the processors, if the data were to be exchanged between the banks.

Benefit calculation module 460 may take the distances calculated by distance module 455 to determine the amount of benefit, if any, that would result by an exchange of data between the ways being analyzed. For example, benefit calculation module 460 may compute the difference of [dist(h, D(h))+dist(k,D(k))]−[dist(k,D(h))+dist(h,D(k))], which corresponds to line 5 of the pseudocode, for the cache lines of banks 256 and 275, as well as the other pairs of cache lines in ways of set 255. In other words, benefit calculation module 460 may calculate [Current distance (Way h)+Current distance (Way k)]−[New distance (Way h)+New distance (Way k)] for each way pairing of set 255.

As part of performing a benefit analysis, benefit calculation module 460 may select a pair of ways for which an exchange of data would reduce access latency for at least one of the cache lines. Based on the pair of ways selected for an exchange of data, data movement module 465 may move or swap the data between the two banks.

Bit setting module 470 may set bits associated with the cache lines of the ways of plurality of banks 485. For example, bit setting module 470 may set bits associated with each of the cache lines of plurality of banks 485 and tag array 490, which may comprise a centralized partial tag array. The bits may comprise, e.g., distance bits, magnitude bits, and least recently used bits.

As noted, the number of modules or elements in an embodiment may vary in alternative embodiments. Some embodiments may have fewer elements than those elements depicted in FIG. 4A or 4B. For example, one embodiment may integrate the functions described and/or performed by latency module 405 and data movement module 410 into a single module. Further embodiments may include more modules or elements than the ones shown in FIGS. 4A and 4B. For example, alternative embodiments may include two or more data movement modules, such as for embodiments with a large number of NUCA cache banks.

Even further embodiments may comprise modules or elements other than those depicted in FIGS. 4A and 4B. For example, some embodiments may comprise an activity monitor to monitor the activity of one or more NUCA caches. The activity monitor may detect when an apparatus or system enters a lower processor activity state, which may present an opportunity for an exchange of data that would minimize or eliminate any impact to performance by reorganizing data of a NUCA cache.

Figure 6:
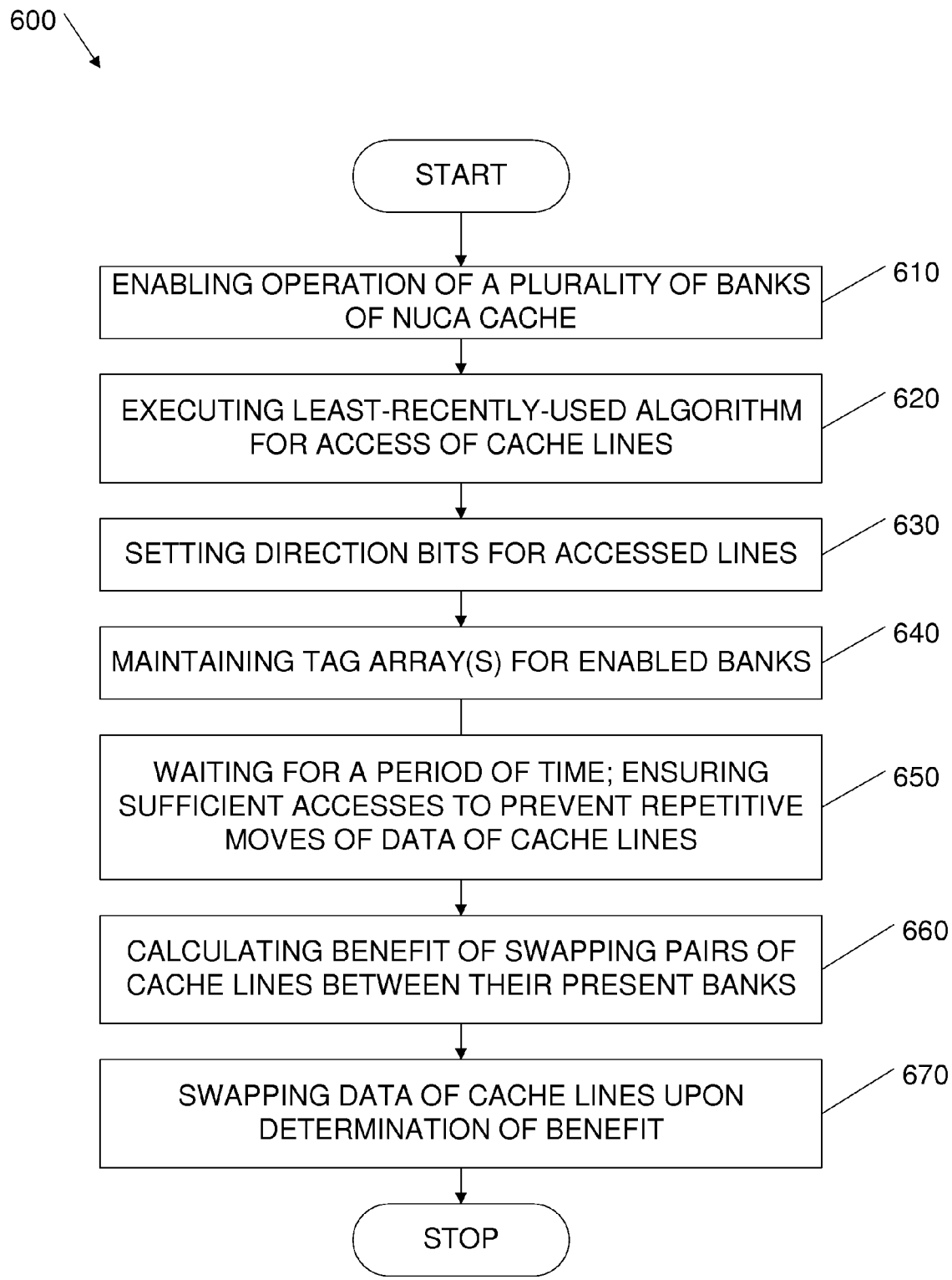
FIG. 6 illustrates one method for requester-sensitive data reorganization in a horizontally distributed NUCA cache.

FIG. 6 illustrates a flowchart 600 of a method for requester-sensitive data reorganization in a horizontally distributed NUCA cache. For example, one or more embodiments of apparatus 400 or 450 shown in FIGS. 4A and 4B may implement the method described by flowchart 600 to reorganize data of cache lines in NUCA caches 430 or 480, respectively.

As the system coupled to apparatus 400 or 450 operates, the system may enable the operation of a number of banks of a NUCA cache (element 610). For example, apparatus 400 may enable the operation of sixteen banks in NUCA cache 430, depicted in FIG. 4A. While the system coupled to apparatus 400 operates, apparatus 400 may perform a variety of activities, such as executing a least-recently-used algorithm for accesses of cache lines (element 620), setting direction bits for accessed cache lines (element 630), and maintaining one or more tag arrays for enabled banks (element 640). For example, apparatus 450 may set direction bits, magnitude bits, and LRU/MRU bits in tag array 490 via bit setting module 470.

As the system continues operating, the system may wait for a period of time to ensure sufficient accesses of cache lines and reduce the likelihood that data will be repetitively and unnecessarily moved between two banks (element 650). By way of illustration, delay module 415 may be arranged to wait for a set number of clock cycles, which may be dynamic and configurable, before enabling latency module 405 to analyze cache lines of plurality of banks 435 for reductions of access latency.

Alternatively, delay module 415 may be configured to ensure that a cache lines are accessed a number of times before the cache lines are eligible to move. For example, a cache line might be in use by more than one processor at a time by plurality of processors 425. Delay module 415 may track both the identification number of the processor that last accessed the cache line and the number of times that the processor accessed the cache line. Delay module 415 may require that the processor access cache line some number of times, such as two or three times, before the cache line will be evaluated for reorganization. Delaying evaluation in such a manner may help prevent repetitive swapping of the cache line between two banks. After calculating the benefit of swapping pairs of cache line between their current locations and proposed locations (element 660) to select a pair that may reduce latency by reorganizing the data, an embodiment of flowchart 600 may continue by swapping data of the cache lines (element 670).

Another embodiment may be implemented as a program product for implementing systems, methods, and apparatuses described with reference to FIGS. 1-6. Embodiments may contain both hardware and software elements. One embodiment may be implemented in software and include, but not limited to, firmware, resident software, microcode, etc.

Furthermore, embodiments may take the form of a computer program product accessible from a computer-usable or computer-readable medium providing program code for use by or in connection with a computer or any instruction execution system coupled with NUCA cache. For the purpose of describing the various embodiments, a computer-usable or computer readable medium may be any apparatus that can contain or store the program for use by or in connection with the instruction execution system, apparatus, or device.

The medium can be an electronic, magnetic, optical, electromagnetic, infrared, or semiconductor system (or apparatus or device) medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code is retrieved from bulk storage during execution. Input/output or I/O devices (including but not limited to keyboards, displays, pointing devices, etc.) can be coupled to the system either directly or through intervening I/O controllers.

Those skilled in the art, having the benefit of this disclosure, will realize that the present disclosure contemplates reorganizing data in non-uniform cache access (NUCA) caches to reduce access latency. The form of the embodiments shown and described in the detailed description and the drawings should be taken merely as examples. The following claims are intended to be interpreted broadly to embrace all variations of the example embodiments disclosed.

Although the present disclosure and some of its advantages have been described in detail for some embodiments, one skilled in the art should understand that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    setting a first plurality of direction bits for a first cache line of a first way, wherein data of the first cache line is located in a first bank of a plurality of banks of a non-uniform cache access (NUCA) cache, wherein further sets of the NUCA cache are horizontally distributed across the plurality of banks;
    setting a second plurality of direction bits for a second cache line of a second way, wherein data of the second cache line is located in a second bank; and
    moving data of the first cache line to the second bank and data of the second cache line to the first bank to reduce access latency between at least one of the first and second cache lines to at least one processor, wherein the moving is based upon a calculation which uses the first and second plurality of direction bits.

2. The method of claim 1, further comprising: setting bits of a partial tag array for the first and second cache lines.

3. The method of claim 2, wherein the partial tag array comprises a distributed array.

4. The method of claim 1, wherein the setting of the first plurality of direction bits comprises storing an identification number of a first processor.

5. The method of claim 4, wherein the setting of the second plurality of direction bits comprises storing a second identification number of a second processor.

6. The method of claim 5, further comprising: performing additional calculations to determine access latencies between a plurality of processors and banks of the plurality of banks before selecting the first and second cache lines for the moving.

7. The method of claim 6, further comprising: determining temporal-based accesses of cache lines of the plurality of banks to enable the performing of the additional calculations.

8. The method of claim 1, wherein the moving data of the first cache line to the second bank and data of the second cache line to the first bank comprises swapping data of non-adjacent banks.

9. An apparatus, comprising:
a latency module to determine access latencies between a plurality of processors and a plurality of banks of a non-uniform cache access (NUCA) cache, wherein ways are horizontally distributed across banks of the NUCA cache, wherein the latency module is configured to determine the access latencies via direction bits for cache lines of the ways; and
a data movement module to move data of a first cache line from a first bank of the plurality of banks to a second bank of the plurality of banks and move data of a second cache line from the second bank to the first bank, wherein the data movement module is configured to move the first and second cache lines based upon the determined access latencies of the latency module.

10. The apparatus of claim 9, further comprising a delay module to enable intervals of time to elapse between determinations of access latencies by the latency module.

11. The apparatus of claim 9, further comprising a partial tag array management module to maintain bits of a centralized partial tag array.

12. The apparatus of claim 11, wherein the NUCA cache comprises an L3 cache module and the latency module comprises a state machine.

13. The apparatus of claim 9, wherein the direction bits for the first cache line indicate a horizontal direction that the first cache line should be moved in order to reduce access latency between the first cache line and a processor which requested the cache line.

14. The apparatus of claim 13, wherein magnitude bits for the first cache line indicate a magnitude for the direction that the first cache line should be moved in order to reduce the access latency.

15. The apparatus of claim 9, wherein the direction bits for the first cache line indicate an identification number of a processor which requested the first cache line.

16. The apparatus of claim 15, wherein the latency module determines the access latencies for the first cache line based upon an inference related to distance between the processor and the first cache line.

17. The apparatus of claim 9, wherein the latency module is arranged to successively determine the improvements of access latencies for pairs of cache lines, wherein further determining an improvement for a pair comprising the first and second cache lines comprises: calculating a first sum of current distances between ways of the first and second cache lines and processors that last requested the first and second cache lines, calculating a second sum of relocated distances of the first and second cache lines and processors that last requested the first and second cache lines, and subtracting the second sum from the first sum.

18. A system comprising:
a plurality of processors;
a plurality of banks of a non-uniform cache access (NUCA) cache, wherein the plurality of processors are coupled to the NUCA cache and arranged to search ways of the NUCA cache, wherein further the ways are horizontally distributed across multiple banks of the NUCA cache; and
a cache controller to evaluate access latencies between the plurality of processors and banks storing cache lines requested by the plurality of processors, wherein the cache controller is configured to swap data of the cache lines between pairs of banks only when at least one of the pairs of cache lines has been consecutively accessed by a processor, and evaluation of the access latencies comprises calculating access latencies for pairs of cache lines stored in pairs of banks to determine whether swapping the cache lines between the pairs of banks reduces access latency between at least one cache line of the pair and a processor that last requested the at least one cache line.

19. The system of claim 18, wherein the cache controller is configured to iteratively calculate access latencies for all cache lines of a set before selecting a single pair of cache lines to swap, wherein further the cache controller is configured to perform the swap, the swap comprising relocating data of the pairs of cache lines between the pairs of banks.

* * * * *